United States Patent
Hake et al.

(10) Patent No.: US 8,001,474 B2
(45) Date of Patent: Aug. 16, 2011

(54) SYSTEM AND METHOD FOR CREATING AND DISTRIBUTING ASYNCHRONOUS BI-DIRECTIONAL CHANNEL BASED MULTIMEDIA CONTENT

(75) Inventors: Rich Hake, Overland Park, KS (US);
Marc McConathy, Leawood, KS (US);
Adil Berdai, Kansas City, MO (US);
Mickey DeHook, Olathe, KS (US)

(73) Assignee: Embarq Holdings Company, LLC, Overland, KS (US)

( * ) Notice: Subject to any disclaimer, the term of this patent is extended or adjusted under 35 U.S.C. 154(b) by 363 days.

(21) Appl. No.: 11/526,420

(22) Filed: Sep. 25, 2006

(65) Prior Publication Data

US 2008/0077867 A1    Mar. 27, 2008

(51) Int. Cl.
*G06F 3/00* (2006.01)
*G06F 15/177* (2006.01)
(52) U.S. Cl. ......... 715/730; 715/733; 715/736; 715/751
(58) Field of Classification Search .................. 715/730, 715/733, 736, 751
See application file for complete search history.

(56) References Cited

U.S. PATENT DOCUMENTS

| | | | | |
|---|---|---|---|---|
| 7,218,626 | B2 * | 5/2007 | Shaheen et al. | 370/338 |
| 7,263,497 | B1 * | 8/2007 | Wiser et al. | 705/51 |
| 7,424,535 | B2 * | 9/2008 | Karaoguz et al. | 709/226 |
| 7,463,738 | B2 * | 12/2008 | Nii | 380/232 |
| 7,774,362 | B2 * | 8/2010 | Dong | 707/781 |
| 7,783,771 | B2 * | 8/2010 | Pantalone | 709/230 |
| 2002/0181424 | A1 * | 12/2002 | Shaheen et al. | 370/338 |
| 2004/0002040 | A1 * | 1/2004 | Foley et al. | 434/118 |
| 2005/0003330 | A1 * | 1/2005 | Asgarinejad et al. | 434/20 |
| 2006/0282387 | A1 * | 12/2006 | Ahmad et al. | 705/50 |
| 2007/0259324 | A1 * | 11/2007 | Frank | 434/322 |

* cited by examiner

*Primary Examiner* — Weilun Lo
*Assistant Examiner* — Shashi K Becker
(74) *Attorney, Agent, or Firm* — SNR Denton US LLP (57) ABSTRACT

A system for creating and distributing asynchronous bi-directional channel based multimedia content including means for creating a selectable list of channels, each channel to contain multimedia content related to each of the list channel; means for recording the multimedia content by a content author relating to the channels; means for uploading and storing the recorded multimedia content to its particular channel on a multimedia server; means for displaying the selectable list of channels to users; and responsive to selecting one of the channel by at least one of the users, means for displaying the multimedia content on a computing device to at least one of the users.

27 Claims, 8 Drawing Sheets

SYSTEM AND METHOD FOR CREATING AND DISTRIBUTING ASYNCHRONOUS BI-DIRECTIONAL CHANNEL BASED MULTIMEDIA CONTENT

FIELD OF THE INVENTION

The present invention relates generally to multimedia content streaming, and more particularly to a system and method for creating and distributing asynchronous bi-directional channel based multimedia content.

Problem

Computing devices, such as personal computers, media players, and hand-held wireless computing devices, have enjoyed, in recent years, an enormous growth in utility. Early computers enabled users to perform tasks such as word-processing and bookkeeping. Today, computers, media players, hand-held wireless devices are used to manage, display, and manipulate multimedia data, such as digital video and audio content. Additionally, computers have become popular devices for communicating, nearly as common as telephones and televisions. In particular, computers are being increasingly used to convey desired multimedia content to users for various purposes ranging from educational purposes to informational purposes.

Communicating audio and video information between computing devices in a dynamic environment can be problematic. First, many conventional computers include software for handling audio and video information that is inconvenient to use based on standards that are incompatible with the media that users wish to view. Add to this the average size of multiple multimedia files in relation to the user's availability of hard drive storage and capacity. Users often experience and enjoy only a fraction of the vast selection of multimedia and video file types and sizes available. For example, a user desiring to link their computer to a website or other computer featuring an audio-video clip can download (or copy) the clip into their local hard drive, and then play back the downloaded copy on their computer as long as their computer or device has the correct plug-in or supports the media file type specific to the downloaded file. Otherwise, they must rely on variable servers, network connections and standards to play this media live.

Many of the current generation of multimedia devices utilizes real simplified syndication (RSS) technology to enable users to subscribe to a particular format, such as Apple® iPod's™ "pod casts," which are then pushed to a user's iTunes play list. This particular format is unidirectional, meaning it pushes the multimedia content to users in one direction but does not enable users to record live multimedia content back the other direction to the iTunes software.

Also, online video blogging software, such as Hipcast™ (formerly known as Audioblog) and others, enable recording of video content but do not automate distribution to subscriber-based channels in an automated fashion. Moreover, most multimedia blogging software supports a lower quality video compression method than typically desired.

Collaborative software such as Adobe® Breeze Live™, WebEx™ and Centra™ enable live collaboration of users with video conferences or text chat. These are primarily for synchronous communications such that they serve the purpose of communicating the multimedia content bi-directionally in near real time. Nevertheless,

Solution

The above-described problems are solved and a technical advance achieved by the present system and method for creating and distributing asynchronous bi-directional channel based multimedia content. The present system provides a method for creating and distributing video content for learning and communication. The system enables a community of users with access to a common network—for instance within a corporation or educational institution—to record videos, attach supplemental content if desired, store searchable videos by topic in directories known as "channels," and alert subscribers to those channels that new content is available.

In an informational and educational setting, the present system enables subject matter experts, instructors, and the like to rapidly create instructional multimedia content such as videos, that is targeted to certain segments of learners and users. The present system provides a type of learning, sometimes referred to as "drip learning," which can include follow-up instruction from a classroom event, periodic updates, information on a topic by a subject matter expert, or an announcement by a leader or executive expected to effect action or a change in behavior by the user.

The present system also applies in broader settings such as a tool to enable representatives of a corporation to educate its external customers, investors, and analysts about important current affairs that may affect their relationships and businesses. In addition, the present system may be used by non-profit organizations, public and private K-12 schools, universities, or by governments to educate their members and constituents.

Learning and communication is rapidly facilitated with the present system. The present system utilizes web-enabled video cameras (webcams) to record video by a content author for learning, educational, instructional, and informational purposes. After a video is recorded, any user who subscribes or is a member of a channel of the present system can view the video through either a push process or a pull process on their personal computer or hand-held wireless communication device, such as a wireless personal digital assistant (PDA) or cell phone, with network access. Users may also collaborate with each other through real-time communication functions (both video and text). Through the present system and method, users can very quickly create, receive, and interact with educational, instructional, and informational multimedia content about business changes and developments of a particular organization or business.

The present system allows any user with proper administrative rights to record their own multimedia content directly to the present system. The recorded multimedia content is instantly compressed through technology on the present system making it instantly available to viewers when the content creator is done recording. In addition, any user who can view recorded content—with the proper administrative rights—can record or upload multimedia content back to the present system either in response to the viewed multimedia content or as a new piece of information or instructional content without the restriction.

Users require little to no video production knowledge and minimal equipment to create video content with the present system. The present system provides all processing, compression, distribution, and playback functionality required to support the method for creating and viewing multimedia content without using a media player limited to media file types. The user need only supply a personal computer or wireless hand-held device equipped with a webcam.

SUMMARY

A system for creating and distributing asynchronous bi-directional channel based multimedia content including means for creating a selectable list of channels, each channel to contain multimedia content related to each of the list channel; means for recording the multimedia content by a content author relating to the channels; means for uploading, searching and storing the recorded multimedia content to its particular channel on a multimedia server; means for displaying the selectable list of channels to users; and responsive to selecting one of the channel by at least one of the users, means for displaying the multimedia content on a computing device to at least one of the users.

DETAILED DESCRIPTION OF THE DRAWINGS

Figure 1:
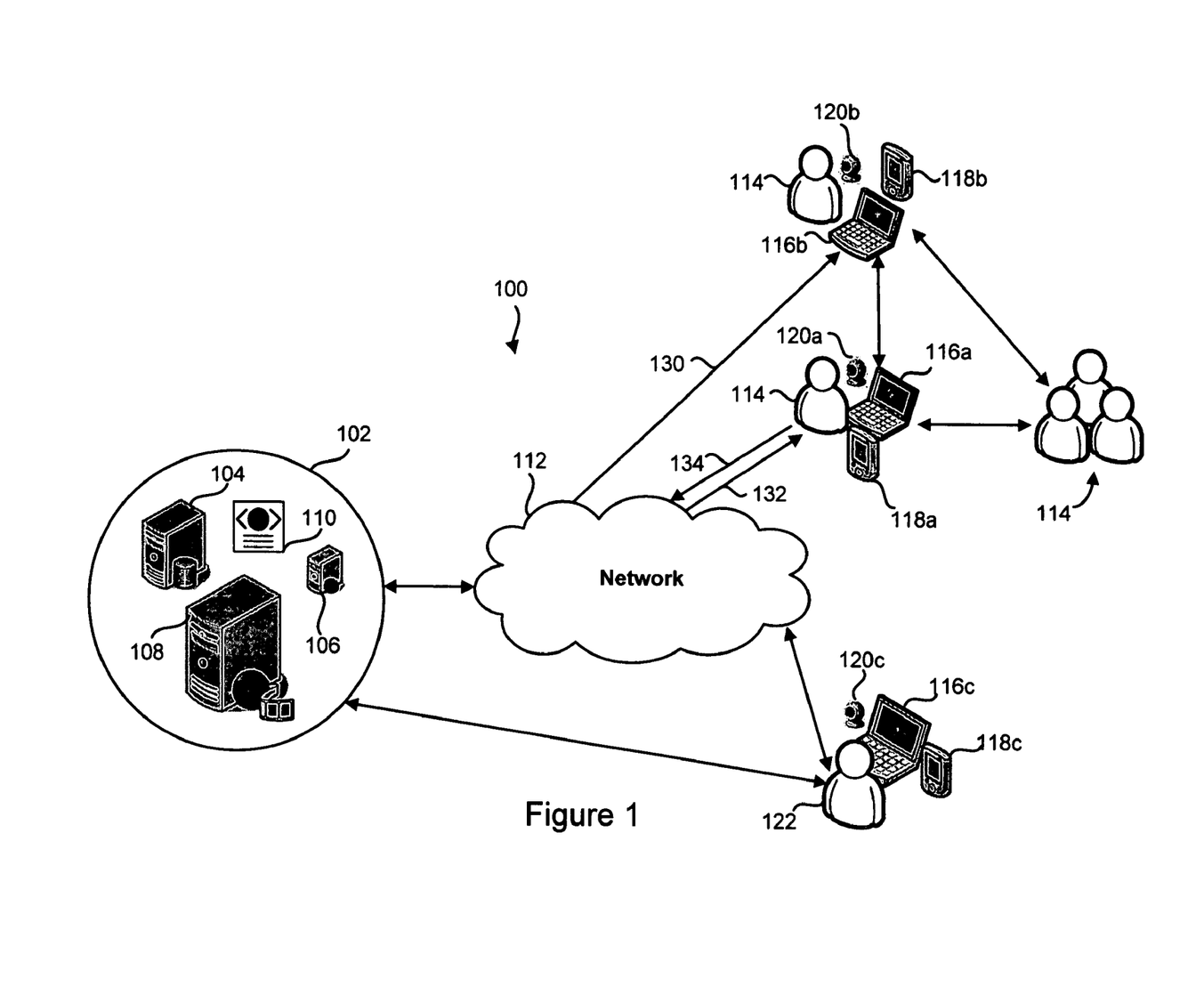
FIG. 1 illustrates a block diagram of an exemplary network of computers in a system for creating and distributing asynchronous bi-directional channel based multimedia content according to an embodiment of the present invention.
Figure 2:
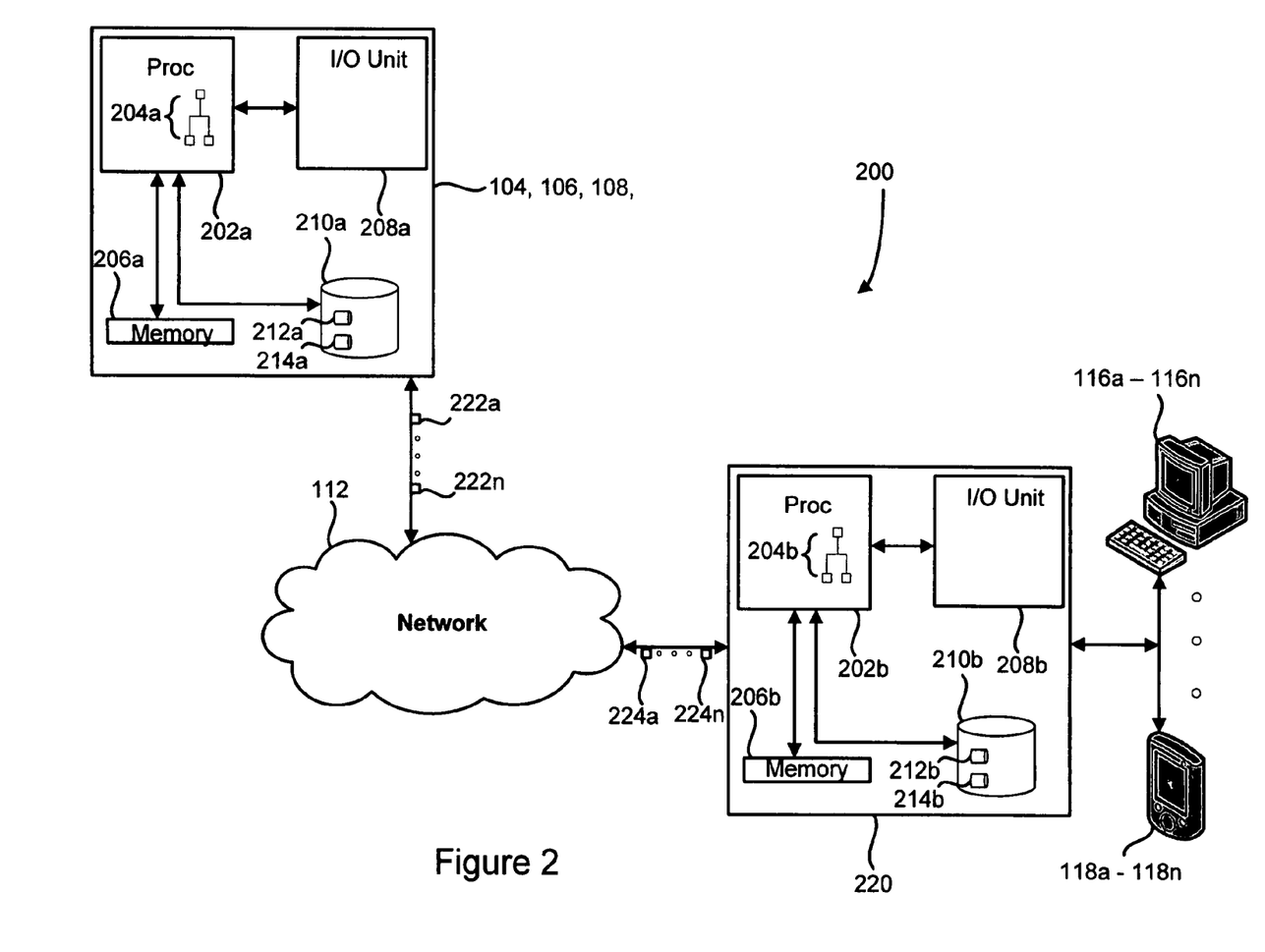
FIG. 2 illustrates a block diagram of an exemplary network of computers in a system for creating and distributing asynchronous bi-directional channel based multimedia content of FIG. 1 according to an embodiment of the present invention.

The term multimedia content means media that may use one or more forms of content and information processing, including voice, audio, video, text, interactive content, animation, graphics, and the like to convey information to a user. Referring to FIGS. 1-12, like reference numerals are used to indicate like parts throughout the drawings. Referring to FIGS. 1 and 2 illustrates embodiments 100 and 200 of an exemplary network of computers in a system for creating and distributing asynchronous bi-directional channel based multimedia content according to an embodiment of the present invention. The present system 100 may include a group of servers 104, 106, and 108 that may or may not be centrally located to each other. In this embodiment, servers 104, 106, and 108 are shown grouped together and located at a central office 102. Server 104 may be a database server, server 106 may be a web server, and server 108 may be a multimedia server. In embodiment 100, server 220 is preferably not included.

In one embodiment, server 104 functions to store data related to the multimedia content. An exemplary server 104 may be a relational database server, such as Microsoft® SQL server and the like. Server 106 functions primarily as a web server for enabling communications between servers 104 and 108 and users 114 and content authors 122 through a network 112. Server 108 is preferably a multimedia content server for uploading, compressing, storing, and distributing preferably in a streaming format multimedia content to users 114. An exemplary server 108 is Adobe®'s Flash Media Server 2. It should be understood that one or more databases may be utilized. Some of the databases may be relational databases or configured otherwise as understood in the art.

In addition to the servers, the present system 100 may include personal computers 116a, 116b, and 116c. Personal computers 116a, 116b, and 116c may also include other peripherals, such as keyboards, displays, microphones, and the like. The present system 100 may also include digital videos cameras 120a, 120b, and 120c for creating digital images for use in the present system 100.

The present system 100 may also include portable wireless communication devices 118a, 118b, and 118c. Some exemplary portable wireless communication devices 118a, 118b, and 118c include: cell phones, PDAs, personal media players and the like. Wireless communications' networks may be used to connect the personal computers 116a, 116b, and 116c and the portable wireless communication devices 118a, 118b, and 118c to the network 112 or directly to the central office 102.

The servers 104, 106, 108, and 220 (FIG. 2) the personal computers 116a, 116b, and 116c, and the portable wireless communication devices 118a, 118b, and 118c may be interconnected by a network 112. Network 112 may be a communications network, a computer network, a combination of them, and the like. Some exemplary networks include: WANs, LANs, Internet, etc. The network 112 may be the Internet, intranet, or other communication system capable of communicating information between computing devices. The server 104, 106, 108, and 220 may communicate data packets 222a-222n and 224a-224n depicted in FIG. 2 containing information related to creating and distributing multimedia content to any one of the other servers 104, 106, 108, and 220 as understood in the art. Similarly, the servers 104, 106, 108, and 220 may communicate information to the server 202a via data packets 222a-222n and 224a-224n, respectively, via the network 112.

As discussed above, the present system 100 and 200 may use any number of personal computers 116a-116n and any number of portable wireless communication devices 118a-118n they may connect to the network 112 through a any of the servers 104, 106, 108, and 220. Each of the personal computers 116a, 116b, and 116c and the portable wireless communication devices 118a, 118b, and 118c may access web server 220 to communicate with the network 112 or they may connect directly, such as through an intranet, to the central office 102. In addition, each of the personal computers 116a, 116b, and 116c and the portable wireless communication devices 118a, 118b, and 118c may communicate with the network 112 through individual and separate servers 220. As discussed above, server 220 may host any number of personal computers 116a-116n and portable wireless communication devices 118a, 118b, and 118c, respectively, utilized by users 114 and content authors 122.

The servers 104, 106, 108, and 220 may include a processor 202a and 202b that executes software 110, 204a, and 204b, respectively. The processor 202a and 202b may be in communication with memory 206a and 206b, an input/output (I/O) unit 208a and 208b, and a storage unit 210a and 210b, respectively. The storage unit 210a and 210b may store databases or data repositories 212a, 214a, 212b, and 214b, respectively thereon. The software 110, 204a, and 204b may include instructions for execution by the processor 202a and 202b for creating and distributing asynchronous bi-directional multimedia content in accordance with the principles of the present system. In addition, the software 110, 204a, and 204b may include instructions for communicating between the servers and any other computing functionality required to operate the present system. In one embodiment, the software 110, 214a, and 214b is composed of a software program as further described herein.

In operation, any of the personal computers 116a, 116b, and 116c and the portable wireless communication devices 118a, 118b, and 118c may execute the software 110, 204a, and 204b to enable the users 114 and content authors 122 at to utilize their personal computers 116a, 116b, and 116c and the portable wireless communication devices 118a, 118b, and 118c, for example, either directly with the servers 104, 106, 108, and 220 or indirectly via the network 112.

Software 110, 204a, and 204b generally is stored and operated on the servers, personal computers 116a, 116b, and 116c and the portable wireless communication devices 118a, 118b, and 118c and may enable users 114 and content authors 122 to view and hear the multimedia content, such as audio and video files. The software provides compression functionality to enable the multimedia content to be efficiently and effectively created and distributed throughout the present system 100 and 200. In particular, the software provides some aspect of traditional streaming media capabilities to create and distribute multimedia content in formats, such as video on demand, web-event broadcasts, MP3 streaming, as well as rich media communication applications like multimedia chat environments, and video messaging. Some exemplary software 110, 204a, and 204b may be Macromedia® Flash™ browser plug-in and Flash Lite. The present system 100 and 200 will operate and display in any commonly used web browser that are capable of supporting the multimedia streams provided by the servers 104, 106, 108, and 220, particularly server 108.

Also, software 110, 204a, and 204b includes all of the necessary application programming interfaces (APIs) for the peripherals, such as the cameras 120a, 120b, and 120c, microphones, and any other peripherals of the present system 100 and 200. Additionally, software 110, 204a, and 204b provide functionality within the present system 100 and 200 for compressing the multimedia content files so that they may be communicated among the servers 104, 106, 108, and 220 at a lower bit rate and file size. Software 110, 204a, and 204b further may include encryption algorithms for delivering the multimedia content among the servers 104, 106, 108, and 220 and the personal computers 116a, 116b, and 116c and the portable wireless communication devices 118a, 118b, and 118c over a secure communications link.

Another feature of software 110, 204a, and 204b is that it distributes multimedia content to users 114 generally produced by content authors 122. The present system 100 and 200 enables a content author 122 with the ability to create as many channels, as described further below, as they desire to be viewed by the users 114. Some exemplary aspects of this feature of the present system 100 and 200 are known as real simplified syndication (RSS), RSS feeds, RSS aggregators, RSS channels, and RSS readers. Further, software 110, 204a, and 204b may also use markup languages to code the features described herein. Generally, these markup languages facilitate the purpose of sharing the multimedia content across the present system 100 and 200. An exemplary language is Extensible Markup Language (XML). Other exemplary markup languages include: GML, RDF/SML, RSS, Atom, MathML, XHTML, SVG, XUL, EAD, Klip, and the like. The present system 100 and 200 may place the channel information into a single file that is coded in such a markup language and read by a complimentary reader, such as an RSS aggregator. The servers 104, 106, 108, and 220 may send out a markup language file that may be read by the RSS feed aggregator that may be located on the user's 114 personal computers 116a, 116b, and 116c and the portable wireless communication devices 118a, 118b, and 118c. Then the multimedia content and formats as described herein can be downloaded or played on the user's 114 personal computers 116a, 116b, and 116c and the portable wireless communication devices 118a, 118b, and 118c by sending the content from the servers 104, 106, 108, and 220.

In one embodiment, the present system 100 uses a "push" method 130 for distributing multimedia content to users 114. In this embodiment, the multimedia content is pushed to users 114 via email or intranet portal based on the channel that is selected by the user as further described below. In one embodiment, users 114 either self-subscribe or are subscribed to channels based on a learning need, area of interest or organizational/functional association. Through administrative controls in system 102 and 220, content authors 122 determine per channel whether all or select content is "pushed" to users 114 via e-mail or portal notification.

The present system 100 and 200 schedules the distribution of emails to target audiences announcing availability of recordings. Also, the present system 100 and 200 emails potential users of certain multimedia content that might be of interest by including the URL address for the link that provides access to video/audio content. It also provides for ability to create the distribution set for emails for users 114, which may be selected from a company's human resources database.

In another embodiment, the present system 100 uses a "pull" method 132 and 134 for distributing multimedia content to users 114. In this embodiment, a channel is looked up or selected 134 and the multimedia content is pulled 132 from the servers 104, 106, and 108 based on the search or channel lookup. Preferably, this is a self-directed behavior by users 114 who may wish to peruse channel content at a point of need or based on a desire to research channel content. As such, users 114 access system 102 and 220 through 112 using a login interface depicted in 300 (FIG. 3).

Figure 3:
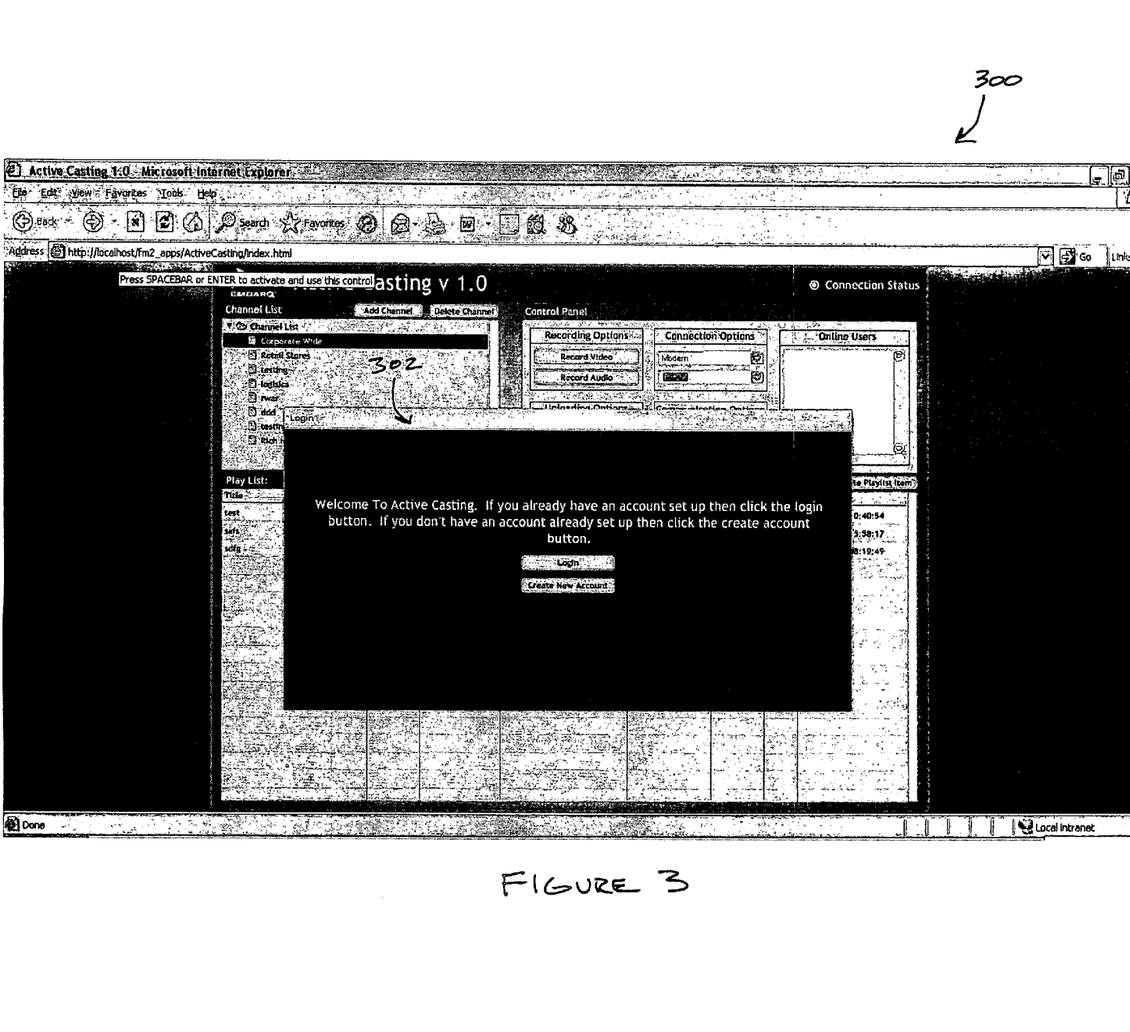
FIG. 3 illustrates an exemplary screenshot of a user interface of the present system showing a login screen window according to an embodiment of the present invention.

FIG. 3 illustrates an exemplary screenshot of a user interface of the present system showing a login screen window 302 according to an embodiment 300 of the present invention. The present system 100 and 200 uses the login screen to control the access to the present system 100 and 200 and to determine those users 114 requesting access to the present system 100 and 200.

Figure 4:
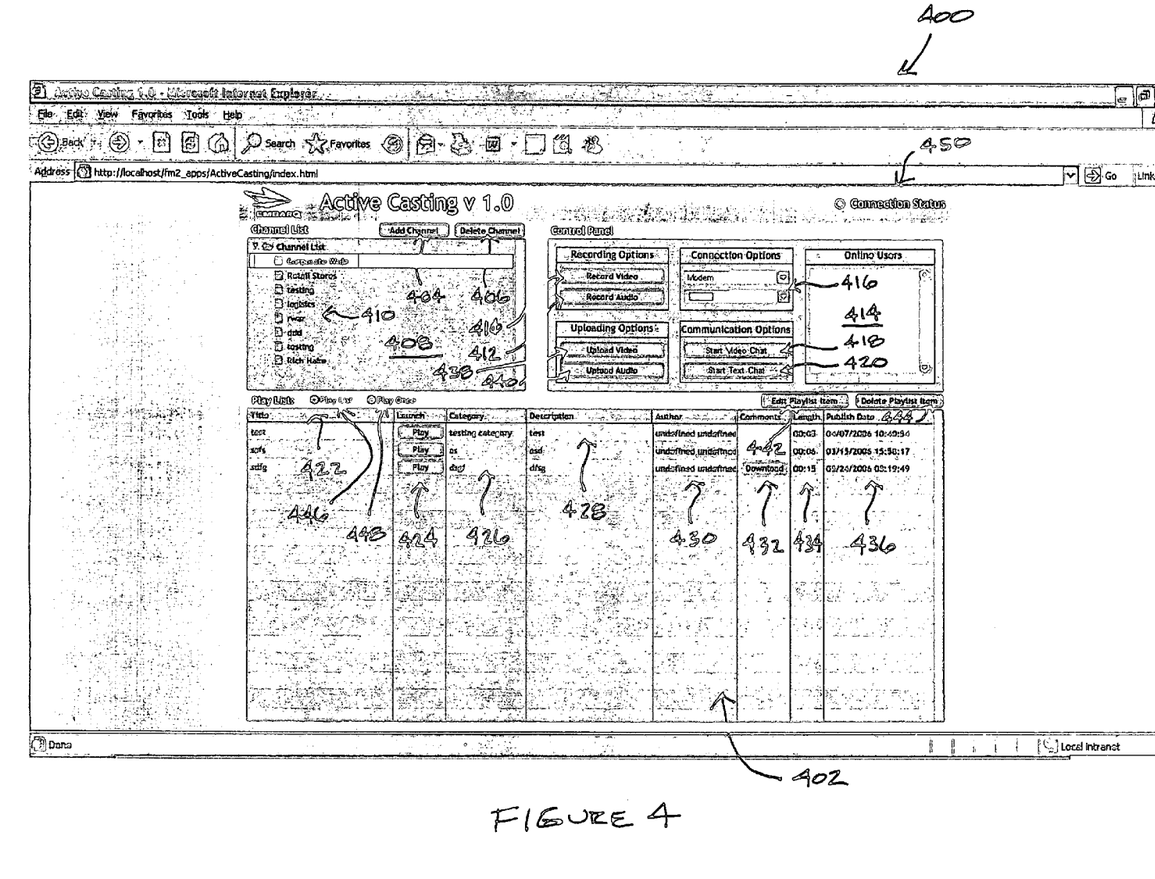
FIG. 4 illustrates an exemplary screenshot of a user interface of the present system showing a main page according to an embodiment of the present invention.

FIG. 4 illustrates an exemplary screenshot of a user interface of the present system showing a main page or control panel 402 according to an embodiment 400 of the present invention. This main page 402 is displayed to a user 114 and content author 122 once they are logged into the present system 100 and 200. In the upper left-hand corner of the main page 402 is the channel list 408 that includes an add channel button 404 and a delete channel button 406 for adding and deleting channels 410 by either an administrator or content author 122. The list of channels 410 displays a directory view of the channels 410 that a user 114 is subscribed to. In the upper right-hand corner of the main page 402 is the control panel that includes a record video button 411, a record audio button 412, connection option buttons 416 (Modem, DSL, LAN, or Custom) for either video or audio, a start video chat button 418, and a start text chat button 420.

In addition, an online user's window 414 displays the names of all the online users 114, content authors 122, or both. In one aspect, the online user's window 414 will display the names of the users 114 that are members of the same channel or community, based on the profile of the users 114. If a user 114 wishes to engage in a video chat with the other online users 114 shown in the online user's window 414, then they would select the start video chat button 418 to initiate a real-time multimedia chat with the other online users 114. Similarly, if the users 114 wished to just engage in a text chat, then they would select the start text chat button 420. If the start video chat button 418 is selected the main display screen may display an equal number of individual displays showing each online user 114. This is especially useful following a viewing of a channel 410 by the users 114 where they wish to further discuss what they viewed and further their understanding of the content contained therein. In addition, an expert in the field or instructor may participate in the video or text chat after their presentation to field more inquiries from the participants.

Figure 5:
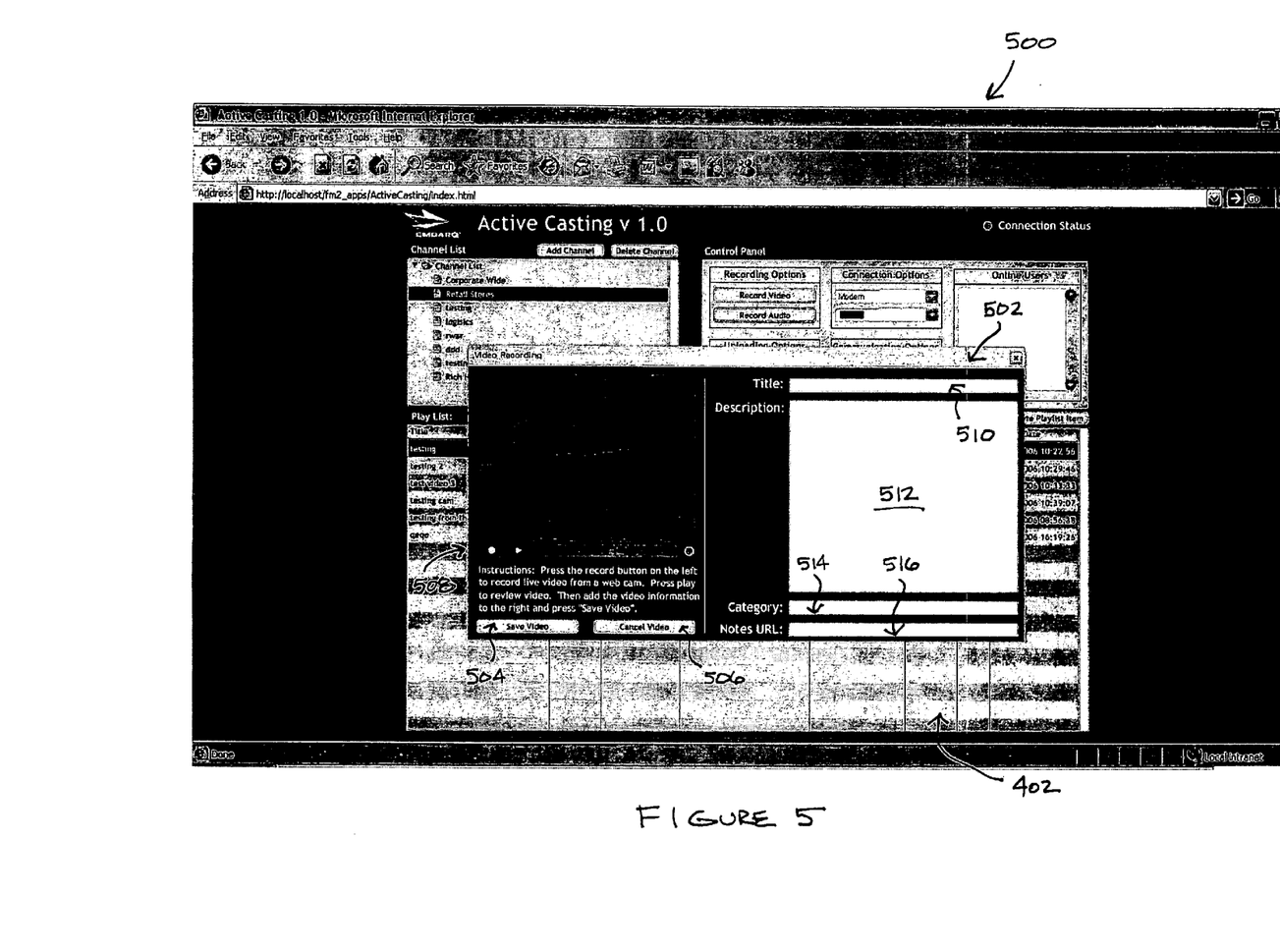
FIG. 5 illustrates an exemplary screenshot of a user interface of the present system showing a video recording window according to an embodiment of the present invention.

The record video button 411 will display the video recording window 502 when it is selected as discussed further below. The record audio button 412 will display an audio recording window when it is selected, similar to the video recording window 502. The upload video button 438 and upload audio button 440 will compress these media to the server 108 when it is selected. The main page 402 further presents a play list 422 of multimedia content related to each particular channel 410 when it is selected. The play list 422 displays in a tabular view the titles and other data for any multimedia content, such as videos, contained in a channel 410 that a user 114 opens in the channel list 408. The main page 402 also displays a play list button 446 and a play once button 448. The play list button 446 will play all multimedia content in the play list 422 by whatever order the user 114 sorts the list. The play once button 448 allows the user to click on the individual play button in the launch column 424 for the multimedia content the user 114 wishes to view. A category column 426, description column 428, author column 430, comments column 432, length column 434, and publish date column 436 are also displayed on the main page 402 to present additional indicia and data related to each play list 422 listed on the main page 402. The edit play list item button 442 and delete play list item 444 allow an administrator or content author 122 to edit the keywords, indicia, data, or information related to an item of multimedia content, such as a video. In addition, in the most upper right-hand corner is a connectivity status 450 that displays the status of the users' 114 and 122 connectivity to the present system 100 and 200 with either a red or green graphical "light" signifying either disconnected or connected status.

The view or display of the present system 100 and 200 may be customized for each user 114 based on both the channels 410 that a user 114 is subscribed to and the level of administrative rights that a user 114 possesses. The channels 410 help to segment the multimedia content when it is published by a content author 122 and when users' who are interested in specific multimedia content can search for them easily because they belong to a particular channel 410.

Yet another feature of the present system 100 and 200 is the use of catalogues for establishing sets of multimedia contents on topics that the administrator "links" to the channels 410. This way all related and important individual multimedia content files would be played at the same time for improved comprehension and understanding to the users 114. For example, if there are ten related multimedia contents related in a certain way, then it would be beneficial to a user 114 to be presented these media in one sequential viewing.

FIG. 5 illustrates an exemplary screenshot of a user interface of the present system showing a video recording window 502 according to an embodiment 500 of the present invention. This video recording window 502 is displayed when a content author 122 "selects" or "clicks" the record video button 411 on the main page 402. The content author 122 accesses the camera 120*c* connected to their personal computer 116*c* or portable wireless communication devices 118*c* and clicks the "record" radio button located in the control panel 508 of the video recording window 502. A user 114 may have access to the video recording window 502 if their access is granted or permission is given to the user 114 by an administrator or the present system. Another button on the control panel 508 is the stop button that stops the recording when it is selected.

Upon completion of recording, the user 114 has the ability to click a button in control panel 508 to play the multimedia content back. The video recording window 502 will not close until the user 114 or content author 122 enters text in fields labeled Title, Description, Category and Notes/URL as discussed below. These items are displayed back to the main page 402 when a multimedia content is opened through the channel 410 it is recorded to.

Alternatively, a camera's 120*a*, 120*b*, 120*c* video feed can be directed to a users' 122 desktop rather than a videographed camera image to capture actions and navigation in software on a user's 122 computer desktop. The present system 100 and 200 treats this the same as any video feed and requires the user 122 to enter a title, description and keywords before saving it to a channel. Users 122 may undertake a similar process to record audio only, although the data feed within the present system 100 and 200 comes from the users' 122 microphone on their personal computers 116*a*, 116*b*, and 116*c* and the portable wireless communication devices 118*a*, 118*b*, and 118*c*.

The content author may also add data in the data fields, such as title 510, description 512, category 514, and notes URL 516. When the content author selects the save video button 504 the video is uploaded and stored to the server 108. Other data that may be uploaded along with the video is title, metadata, description of the video, an associated URL, category, etc. Most of this data is stored to the server 104 for later access by a user 114. This data assists a content user 114 with searching for multimedia content related to a particular channel.

Once content is recorded to a channel 410, it may be instantly compressed by the technology underlying the present system. The compression reduces the size of the media file to ease network traffic and download speed. Users 114 listed in the database or server 104 for each channel 410 as subscribers are then notified via e-mail that new content has been posted to the channel 410. Users 114 can then select on a system-generated URL in the e-mail to access the present system and launch the video in a player window—this is the push process 130 for content distribution as discussed above. At anytime, users 114 have the ability to launch the present system and peruse the contents of the channels 410 they are subscribed to and enjoy multimedia content, such as videos and audio content from the play list 422—this is the pull process 132 and 134 for content distribution as discussed above.

An additional feature of the present system 100 and 200 is the ability to upload existing media files that were created outside of the system, such as by professional video studios and the like, to a system channel 410. These files are also compressed after they are uploaded and display in the media player of the users' personal computers 116*a*, 116*b*, and 116*c* and the portable wireless communication devices 118a, 118b, and 118c just as a file recorded with the present system.

Another feature of the content creation process in the present system 100 and 200 is the management of a quality assurance process of recorded videos. At the discretion of an administrator, multimedia content, such as videos, can be inactive in the channel 410 (not viewable by users 114) until a they are reviewed and approved. Once a reviewer designates the content as approved, it becomes active in the channel 410. If a reviewer does not approve content for posting to a channel 410, then the originator or content author 122 is notified of this decision via e-mail.

In addition, the present system 100 and 200 has functionality to allow a content author 122 to edit their recording before uploading it to the system. Further, the present system allows the content author 122 to edit the recordings by enabling them to clip several recordings together.

Figure 6:
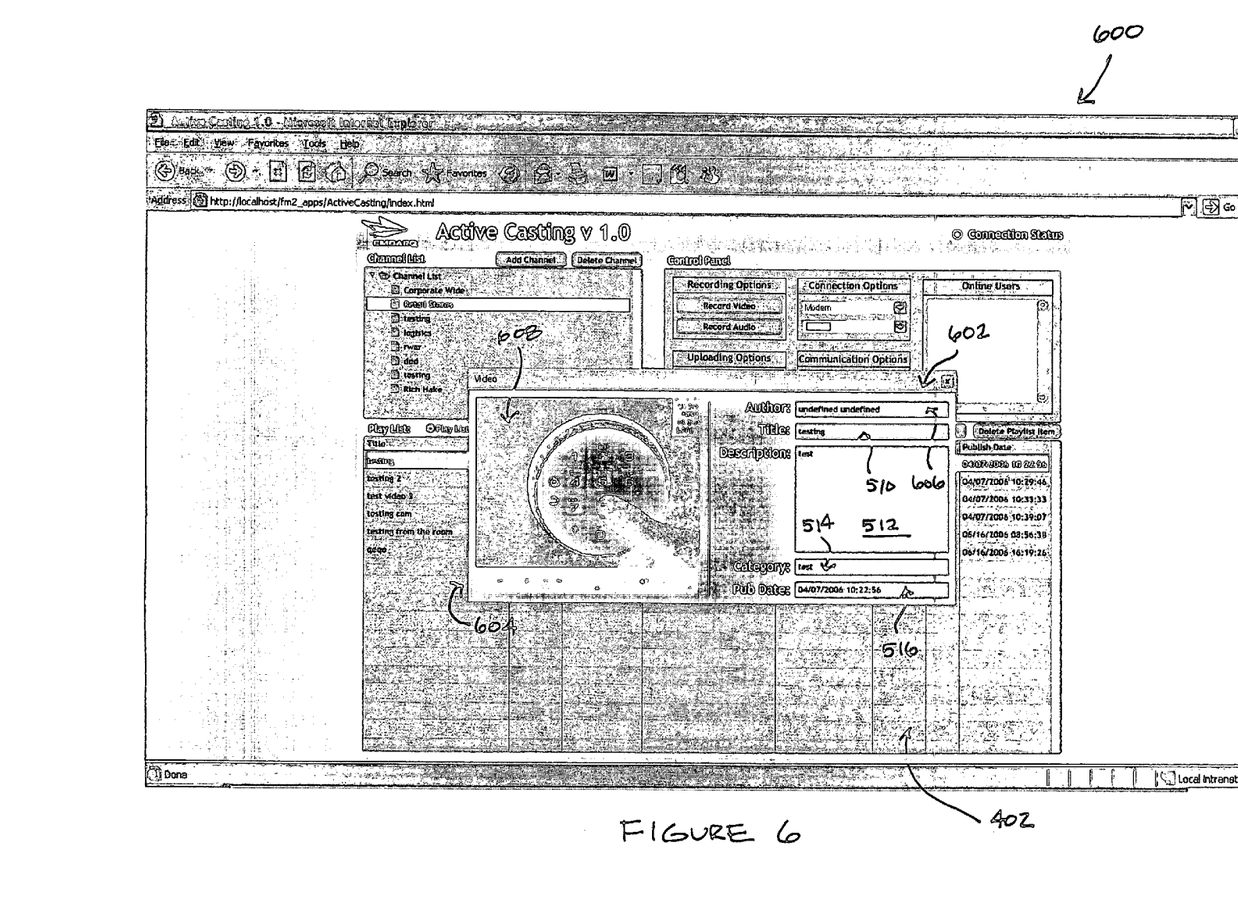
FIG. 6 illustrates an exemplary screenshot of a user interface of the present system showing a video playback window according to an embodiment of the present invention.
Figure 7:
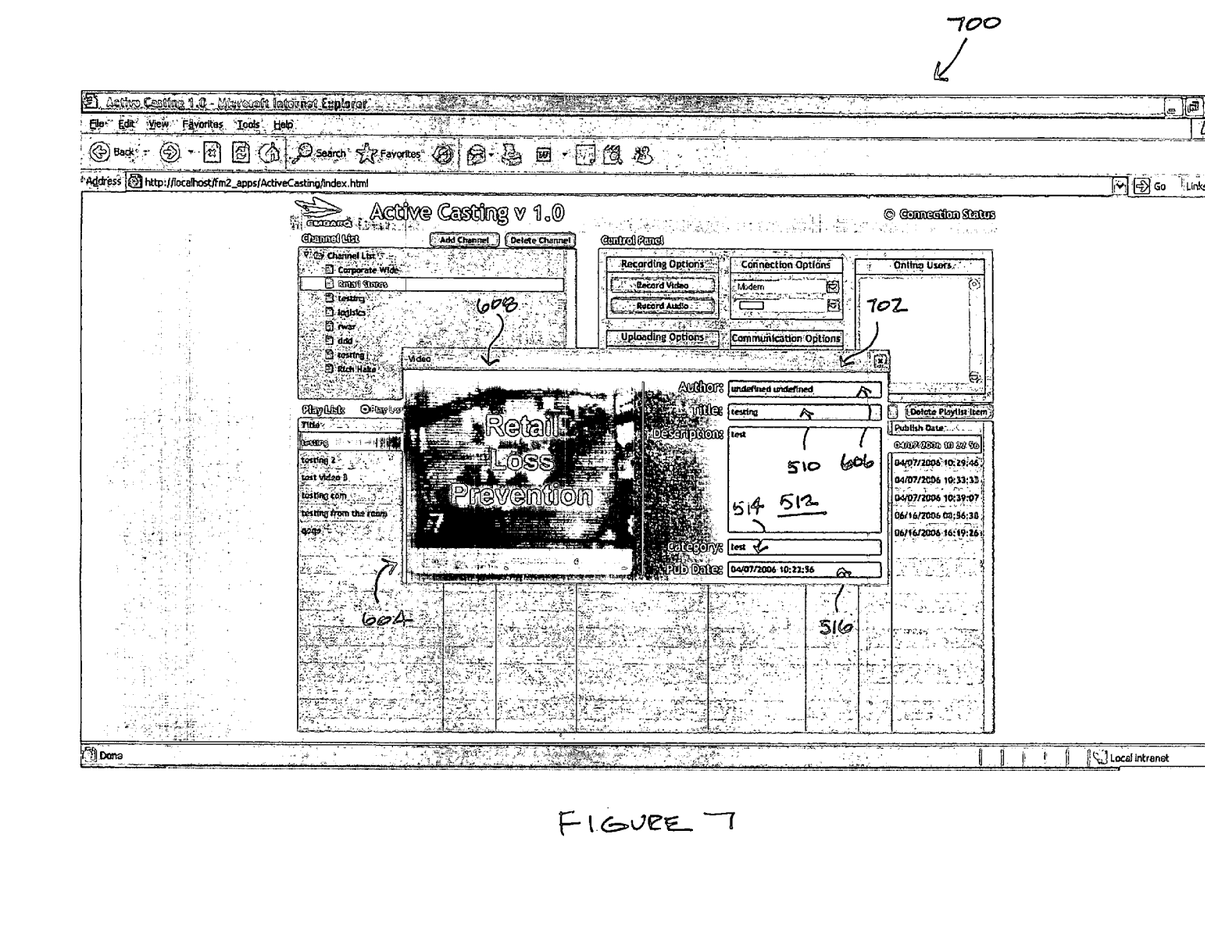
FIG. 7 illustrates another exemplary screenshot of a user interface of the present system showing a video playback window according to an embodiment of the present invention.

FIGS. 6 and 7 illustrate an exemplary screenshot of a user interface of the present system showing a video playback window 602 according to an embodiment 600 of the present invention. This video playback window 602 is displayed to the user 114 when they select the play button 424 on the main page 402. This video player 602 includes control panel 604 that includes a play button, pause button, fast rewind button, fast forward button, a slider button that can move the progress of the video either way, and a volume control button. As can be seen from the still frame of the video displayed in the video player 608, that an educational multimedia content are presented to a user 114. Playback can occur on a personal computers 116a, 116b, and 116c and the portable wireless communication devices 118a, 118b, and 118c in their web browsers. Connectivity to the network 112 is required to both record and view multimedia content as well as receives alerts when new content is posted to a channel 410.

In one embodiment, users 114 connected to the network 114 may access a web browser. A layer of security may prevent non-authorized users 114 from accessing the present system 100 and 200, but also may retrieve the users' account credentials to build a personalized channel 410 list based on the users' subscriptions stored in a database, such as server 104. If a user 114 does not have credentials or authorization, the present system 100 and 200 may enable them to create an account after validation of their e-mail address. Users 114 may also be reminded of their password if they've lost it.

As discussed above, the present system 100 and 200 provides real-time compression of videos that are streamed and stored to the server 108 using compression and transfer protocol, such as FMS by Macromedia®. Upon recording storing of a video or other multimedia content, the multimedia content resides in a director of channels 410 on the server 108 and stores metadata related to the piece of media in server 104 for ease of retrieval and management by a user 114 or content author 122. Metatagging the videos enable search ability based on keywords, channel, or authors across the entire present system. The server 104 also serves as a repository for user profiles and privileges as discussed above. Channels 410 and media package information is also stored in the server 104 as well as user subscriptions to these channels 410.

Another feature of the present system 100 and 200 is that it rates by several methods the popularity of its multimedia content for more beneficial presentation to its users 114. For example, the present system 100 and 200 inquires with the users 114 regarding their impressions of a particular multimedia content and then notes these inquiries into the server 104 for rating purposes. Then the present system 100 and 200 can use this survey data to then present the multimedia content in the play list 422 accordingly from most popular to least popular. It is also a way of determining whether some content needs to be improved.

In addition, the present system 100 and 200 allows users 114 to provide their feedback to a message board and record their specific comments about each multimedia content within each channel 410. The message board may also contain a thread for the channel 410.

Another feature of the present system 100 and 200 is its ability to take like screenshots or captures and incorporate them into the content author's 122 multimedia content. This provides a fuller multimedia presentation to the user 114. For example, a content author 122 can record the video of himself presenting information and then take a screenshot of his computer and add that to the presentation. This allows the content author 122 to capture and integrate various other media into his video presentation during the presentation.

An example will be useful in understanding the functionality and power of the present system 100 and 200. A workforce in a company employs one set of sales people to sell a line of products to small businesses and another set of sales people to sell consumer products. Even though they belong to the same sales force they might subscribe to a different channels 410 where they would see video tutorials or see bits of videos that are related to their specific field of sales. Also each of the groups can subscribe to more general channels 410, such as an executive message channel 410 to receive important communications from the executives of the company.

The above example fosters collaboration among the users 114 by allowing them to provide feedback to each other about a particular piece of multimedia content they viewed, through video and text chat as discussed above, from their personal computers 116a, 116b, and 116c and the portable wireless communication devices 118a, 118b, and 118c. This would likely produce a richer feedback from sales people saying, "well I agree with this, but if you add this to it then it would become even more effective."

The present system 100 and 200 assign and maintain roles of its users 114, administrators, and content authors 122. This function directs the access to certain parts of the present system, such as viewing, listening, recording, and the like. The present system also assigns access to specific channels 410 within the system. It may utilize active directory authentication or another authentication protocol as understood in the art to undertake this function.

In one aspect, the present system 100 and 200 assigns each channel an owner who approves the multimedia content and the selection content for that particular channel 410. In addition, each channel may have a public versus a private classification for further controlling the access to the system. The present system 100 and 200 also provide accessibility to the disabled user 114 and is useable in foreign languages.

Figure 8:
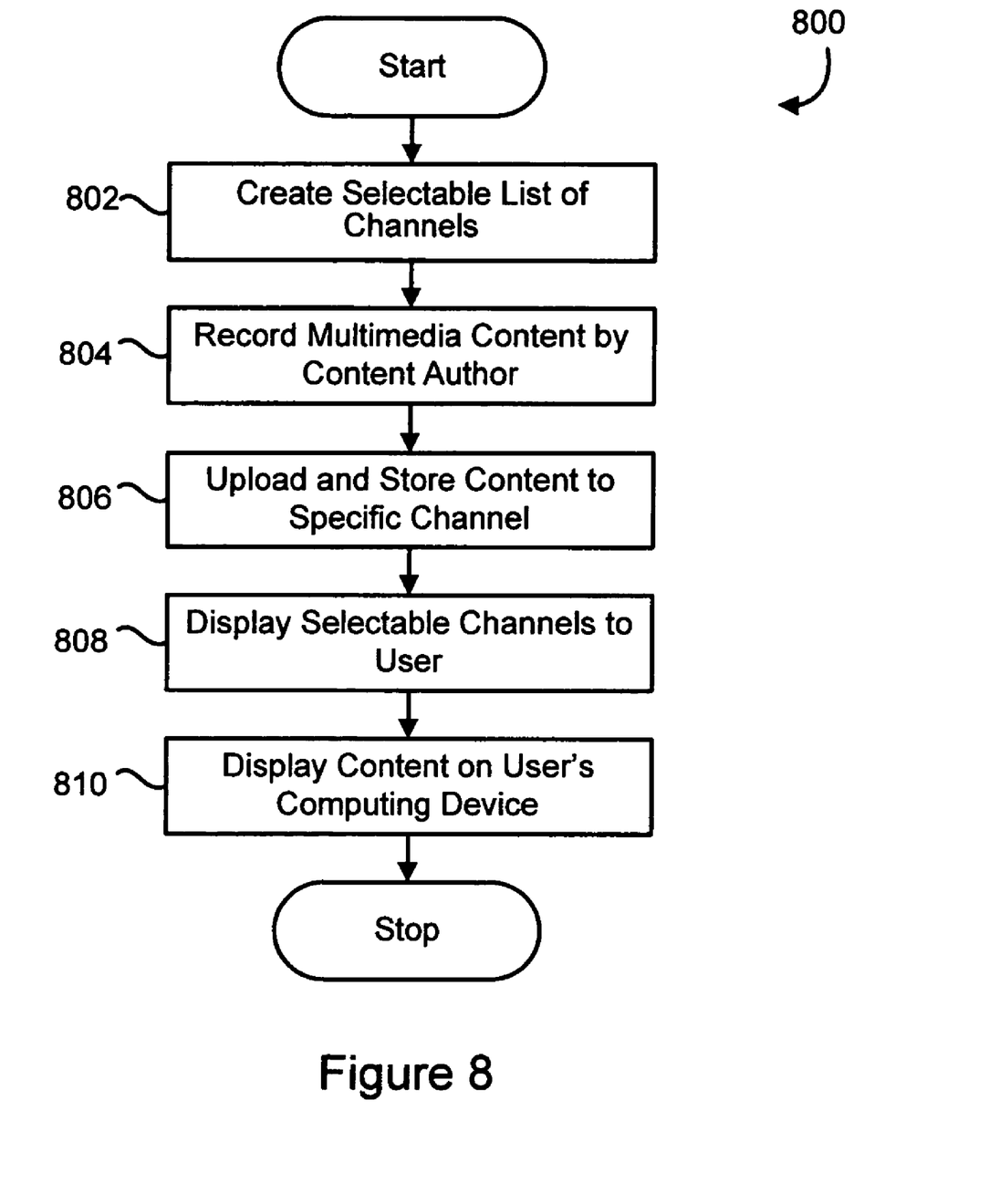
FIG. 8 illustrates a block diagram of an exemplary process for creating and distributing asynchronous bi-directional channel based multimedia content according to an embodiment of the present invention.

In addition to the aforementioned aspects and embodiments of the present system for creating and distributing asynchronous bidirectional channel based multimedia content, the present invention further includes methods for creating and distributing asynchronous bi-directional channel based multimedia content. FIG. 8 illustrates a flow diagram of an embodiment 800 of one such process.

In step 802, a selectable list of channels that each contains multimedia content is created. In step 804, a multimedia content is recorded by a content author that is related to one of the channels. In step 806, the recorded multimedia content is uploaded and stored to its particular channel on a multimedia server. In step 808, a selectable list of channels is displayed to at least one user. In step 810, the multimedia content of a particular channel is displayed on a computing device to at least one user responsive to the user selecting one of the channels.

Although there has been described what is at present considered to be the preferred embodiments of the system and method for creating and distributing asynchronous bi-directional channel based multimedia content, it will be understood that the system and method for creating and distributing asynchronous bi-directional channel based multimedia content can be embodied in other specific forms without departing from the spirit or essential characteristics thereof. For example, multimedia servers, other than those described herein, could be used without departing from the spirit or essential characteristics of the system and method for creating and distributing asynchronous bi-directional channel based multimedia content. The present embodiments are, therefore, to be considered in all aspects as illustrative and not restrictive. The scope of the system and method for creating and distributing asynchronous bi-directional channel based multimedia content is indicated by the appended claims rather than the foregoing description.

What is claimed:

1. A method for creating and distributing asynchronous bi-directional channel based multimedia content comprising:
   creating a selectable list of channels, each channel to contain a plurality of multimedia content related to one of a plurality of topics;
   recording multimedia content by an administrator relating to one of the plurality of topics;
   uploading and storing said recorded multimedia content to a channel related to the one of the plurality of topics on a multimedia server;
   displaying said selectable list of channels to a user;
   responsive to receiving a user-selection of the channel, displaying said recorded multimedia content on a computing device to the user;
   recording or uploading additional multimedia content relating to the one of the plurality of topics of the channel, the additional multimedia content generated by an authorized user of the multimedia server that is not the administrator of the channel;
   assigning the additional multimedia content an inactive status to prevent said additional multimedia content from being viewed by other subscribers of the channel until the administrator of the channel reviews and approves the additional multimedia content; and
   removing the inactive status once the administrator designates the additional multimedia content as approved to enable other subscribers of the channel to view the additional multimedia content or notifying the authorized user of the multimedia server that generated the additional multimedia content if the administrator does not approve the additional multimedia content the administrator being a person with administrative capability for approving or not approving multimedia content for the channel.

2. The method of claim 1 wherein said uploading further comprises:
   compressing the uploaded multimedia content prior to being stored to its particular channel.

3. The method of claim 1 further comprising:
   generating data associated with each of said recorded multimedia content; and
   responsive to said uploading and storing of recorded multimedia content, storing said generated data to a database server.

4. The method of claim 1 wherein said displaying said multimedia content further comprises:
   receiving a rating for the multimedia content from one of the plurality of subscribers of the channel;
   generating a popularity rating for the multimedia content using the rating from the one of the plurality of subscribers of the channel; and
   displaying the multimedia content in a sequential order within the channel based on the popularity rating for the multimedia content.

5. The method of claim 1, wherein the administrator designates the channel as either private or public, wherein a public designation enables any authorized user of the multimedia server to subscribe to the channel, whereas a private designation requires approval by the administrator to enable a user to subscribe to the channel.

6. The method of claim 1 further comprising:
   pulling said multimedia content to said at least one of said users, said pulling comprising:
   receiving a channel lookup based on a desired channel from at least one of said users; and
   transmitting multimedia content based on said channel lookup to said at least one of said users.

7. The method of claim 1 further comprising:
   displaying all said users receiving said multimedia content of a particular one of said channels to the computer displays of each of the other of said users to enable discussion regarding the viewed multimedia content; and
   providing audio feeds of said discussion to all of said users.

8. The method of claim 1 further comprising:
   bundling all of at least one of said channel's multimedia content to create a catalogue of said channel's multimedia content; and
   displaying said catalogue to said users subscribing to said channel.

9. The method of claim 1 further comprising:
   controlling the access by said users to each of said channels based on a subscription each of said user to each of said channels.

10. A system for creating and distributing asynchronous bi-directional channel based multimedia content comprising:
    means for creating a selectable list of channels for viewing content on a multimedia server, each channel to contain a plurality of multimedia content related to each of said list channel; each channel to contain multimedia content related to one of a plurality of topics;
    means for recording said multimedia content by a content author relating to said channels;
    means for uploading and storing said recorded multimedia content to a channel on the multimedia server;
    means for displaying said selectable list of channels to users;
    means for assigning an inactive status to the multimedia content to prevent access to the multimedia content by subscribers of the channel;
    means for enabling an administrator of said channel to review and approve the multimedia content and to designate the multimedia content as active to enable access to the multimedia content by the subscribers of the channel;
    means for notifying the content author that generated the multimedia content if the administrator does not approve the multimedia content; and
    means for pushing the multimedia content to the subscribers.

11. The system of claim 10 wherein said means for uploading further comprises:
means for compressing the uploaded multimedia content prior to being stored to its particular channel.

12. The system of claim 10 further comprising:
means for generating data associated with each of said recorded multimedia content; and
responsive to said uploading and storing of recorded multimedia content, means for storing said generated data to a database server.

13. The system of claim 10 wherein said means for displaying said multimedia content further comprises:
means for streaming said multimedia content to said at least one of said users.

14. The system of claim 10 further wherein said means for recording said multimedia content further comprises:
means for recording said video content on a web enabled camera for uploading to said channel.

15. The system of claim 10 further comprising:
said means for pushing comprising:
means for sending to email addresses of the subscribers the multimedia content.

16. The system of claim 10 further comprising:
means for pulling said multimedia content to said at least one of said users, said means for pulling comprising:
means for receiving a channel lookup based on a desired channel from at least one of said users; and
means for transmitting multimedia content based on said channel lookup to said at least one of said users.

17. The system of claim 10 further comprising:
means for displaying all said users receiving said multimedia content of a particular one of said channels to the computer displays of each of the other of said users to enable discussion regarding the viewed multimedia content; and
means for providing audio feeds of said discussion to all of said users.

18. The system of claim 10 further comprising:
means for bundling all of at least one of said channel's multimedia content to create a catalogue of said channel's multimedia content; and
means for displaying said catalogue to said users subscribing to said channel.

19. The system of claim 10 further comprising:
means for controlling the access by said users to each of said channels based on a subscription each of said user to each of said channels.

20. An electronic system for creating and distributing asynchronous bi-directional channel based multimedia content comprising:
an electronic input device for producing input signals;
a display;
an electronic memory storing a list of channels of multimedia content and lists, wherein each channel to contain a plurality of multimedia content related to one of a plurality of topics; and
an electronic processor communicating with said memory and said display and responsive to the input signals to:
direct said display to display said channels;
store, in said memory, at least one multimedia content file in a channel associated with a topic corresponding to the at least one multimedia content file;
designate said at least one multimedia content file as inactive in order to prevent access to the at least one multimedia content file until an administrator of the channel approves the at least one multimedia content file;
receive a channel selection from a user;
communicate said multimedia content, if preapproved by said administrator, to said display, else notify a user that generated the at least one multimedia content file if the administrator does not approve the said at least one multimedia content file; and
display all said users receiving said multimedia content of a particular one of said channels to the computer displays of each of the other of said users to enable discussion regarding the viewed multimedia content.

21. The system as in claim 20 wherein the electronic processor is further responsive to the input signals to:
record a multimedia content from a content author; and
responsive to said recording, establish, a upload link to a multimedia server for compressing and storing said multimedia content to one of said channels.

22. The system as in claim 21 wherein the electronic processor is further responsive to the input signals to generate data associated with each of said recorded multimedia content; and responsive to said selecting said upload link, storing said generated data to a database server.

23. The system as in claim 20 wherein the electronic processor is further responsive to the input signals to:
stream said multimedia content to said at least one of said users.

24. The system as in claim 20 wherein the electronic processor is further responsive to the input signals to:
push said multimedia content to said at least one of said users, said push comprising:
sending to email addresses of users' multimedia content based on channels desired by a particular user.

25. The system as in claim 20 wherein the electronic processor is further responsive to input signals to:
pull said multimedia content to said at least one of said users, said pull comprising:
receiving a channel lookup based on a desired channel from at least one of said users; and
transmitting multimedia content based on said channel lookup to said at least one of said users.

26. The system as in claim 20 wherein the electronic processor is further responsive to input signals to:
provide audio feeds of said discussion to all of said users.

27. The system as in claim 20 wherein the electronic processor is further responsive to input signals to:
bundle all of at least one of said channel's multimedia content to create a catalogue of said channel's multimedia content; and
display said catalogue to said users subscribing to said channel.

* * * * *